(12) United States Patent
Chandrasekharan et al.

(10) Patent No.: US 9,239,831 B2
(45) Date of Patent: Jan. 19, 2016

(54) DATA LOCALIZATION SERVICE MADE AVAILABLE BY A WEB BROWSER

(75) Inventors: Sudhakar Chandrasekharan, Los Gatos, CA (US); Kirill Buryak, Sunnyvale, CA (US); Shanjian Li, Lake Oswego, OR (US); Vladimir Weinstein, Burlingame, CA (US); Robert S. Jung, Los Altos, CA (US); Jungshik Shin, Sunnyvale, CA (US); Nebojsa Ciric, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1052 days.

(21) Appl. No.: 13/313,157

(22) Filed: Dec. 7, 2011

(65) Prior Publication Data

US 2015/0154182 A1 Jun. 4, 2015

(51) Int. Cl.
*G06F 17/21* (2006.01)
*G06F 17/28* (2006.01)

(52) U.S. Cl.
CPC .................................. *G06F 17/289* (2013.01)

(58) Field of Classification Search
CPC ....... G06F 17/2247; G06F 21/53; G06F 8/30; G06F 11/1479; G06F 11/2028; G06F 17/30905; G06F 17/289
See application file for complete search history.

(56) References Cited

U.S. PATENT DOCUMENTS

| | | | |
|---|---|---|---|
| 6,964,014 B1 * | 11/2005 | Parish | 715/205 |
| 7,007,026 B2 * | 2/2006 | Wilkinson et al. | 1/1 |
| 7,721,271 B2 | 5/2010 | Pournasseh et al. | |
| 7,747,588 B2 | 6/2010 | Thompson et al. | |
| 8,155,672 B2 * | 4/2012 | Bajpai et al. | 455/456.5 |
| 8,250,653 B2 * | 8/2012 | Wang et al. | 726/22 |
| 8,627,216 B2 * | 1/2014 | Brichford et al. | 715/760 |
| 2007/0038849 A1 * | 2/2007 | Madampath | 712/228 |
| 2008/0271045 A1 * | 10/2008 | Le Roy et al. | 719/311 |
| 2010/0287618 A1 * | 11/2010 | Howell et al. | 726/26 |
| 2011/0161841 A1 * | 6/2011 | Parsell et al. | 715/760 |

* cited by examiner

*Primary Examiner* — Wilson Tsui
(74) *Attorney, Agent, or Firm* — Remarck Law Group PLC

(57) ABSTRACT

A data localization service is provided for a web browser residing on a computing device. Depending upon the availability of the network connection as well as the level of native support in the browser, the data localization service will support different levels of service/performance to optimize the user experience. To do so, the data localization service includes a priority handler configured to receive a request to localize data from a requesting client application and provide in response thereto a localized representation of the data to the requesting client application. The data localization service may also include a native data localizer configured to receive a request to localize data from the priority handler and localize the data in accordance with a localization preference parameter indicative of a locale. The native data localizer may be a function integrated into the script interpreter of the web browser.

20 Claims, 4 Drawing Sheets

DATA LOCALIZATION SERVICE MADE AVAILABLE BY A WEB BROWSER

FIELD

The present disclosure relates to a data localization service made available to web applications by a web browser.

BACKGROUND

Data localization and other support services are needed to support web applications which present data in different languages and to persons in different locales. For any given user, only a subset of data will be pertinent (e.g., one of hundreds of potential languages). Furthermore, these types of services can be too large to be hosted on the client device, such as a mobile phone. As a result, these types of services can be made available to web applications over a network from a server. While this approach has proven to be useful in certain situations, there are some drawbacks. Therefore, applicant proposes to expose a more robust data localization service to the web applications. Depending upon the availability of the network connection as well as the level of native support in the browser, the data localization service will support different levels of service/performance to optimize the user experience.

This section provides background information related to the present disclosure which is not necessarily prior art.

SUMMARY

A data localization service is provided for a web browser residing on a computing device. The data localization service may include a priority handler and a native data localizer. The priority handler is configured to receive a request to localize data from a requesting client application and provide in response thereto a localized representation of the data to the requesting client application. The priority handler may be implemented as a script expressed in a scripting language and executed by a script interpreter in the web browser. The native data localizer is configured to receive a request to localize data from the priority handler and localize the data in accordance with a localization preference parameter indicative of a locale. The native data localizer may be a function integrated into the script interpreter.

The data localization service may also include an external localization function that is implemented by a computer program independent from the web browser but resides on the computing device. The external localization function operates to service the request when the call to the native data localizer fails.

The data localization service may further include a remote localization function that resides on a server that is accessed over a data network by the priority handler. The priority handler calls a remote localization function to service the request when the calls to both the native data localizer and the external localization function fail.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
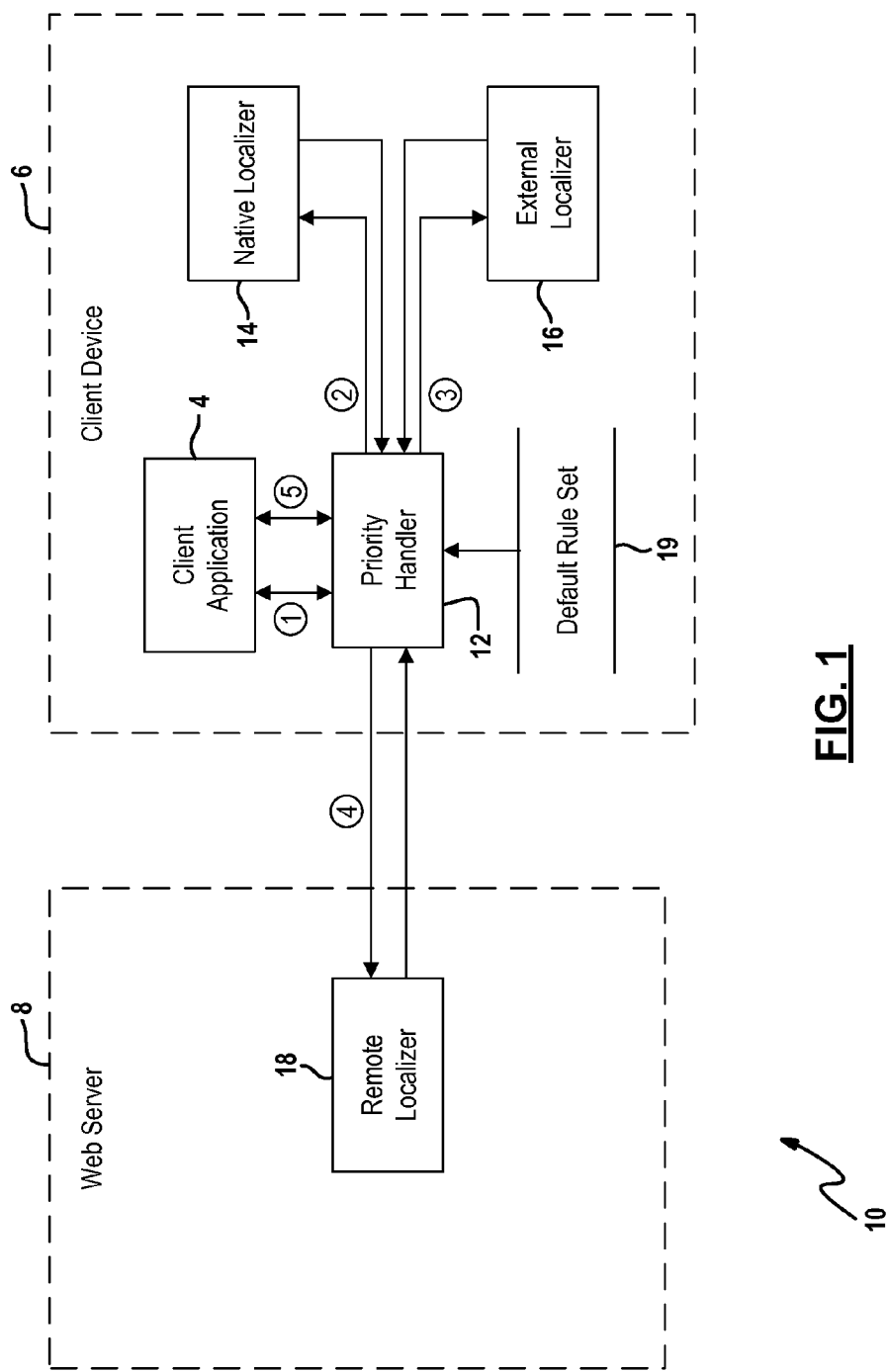
FIG. 1 is a diagram depicting an example of a data localization service made available by a web browser.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts an example of a data localization service 10. The data localization service 10 is comprised generally of a priority handler 12, a native localizer 14 and an external localizer 16. In an example embodiment, the data localization service 10 is integrated into a web browser residing on a client computing device 6. Each of these components and their interactions are further described below. Client computing devices 6 may include but are not limited to phones, tablets, cameras, laptop or desktop computers. The data localization service 10 may also include a remote localizer 18 residing on a server computer 8 that is remote from the client device 6. While reference is made throughout the application to a web browser, it is envisioned that the data localization service 10 could be integrated into other types of software applications residing on a computing device, including but not limited to email application, social networking application, a navigation application and the like.

Figure 2:
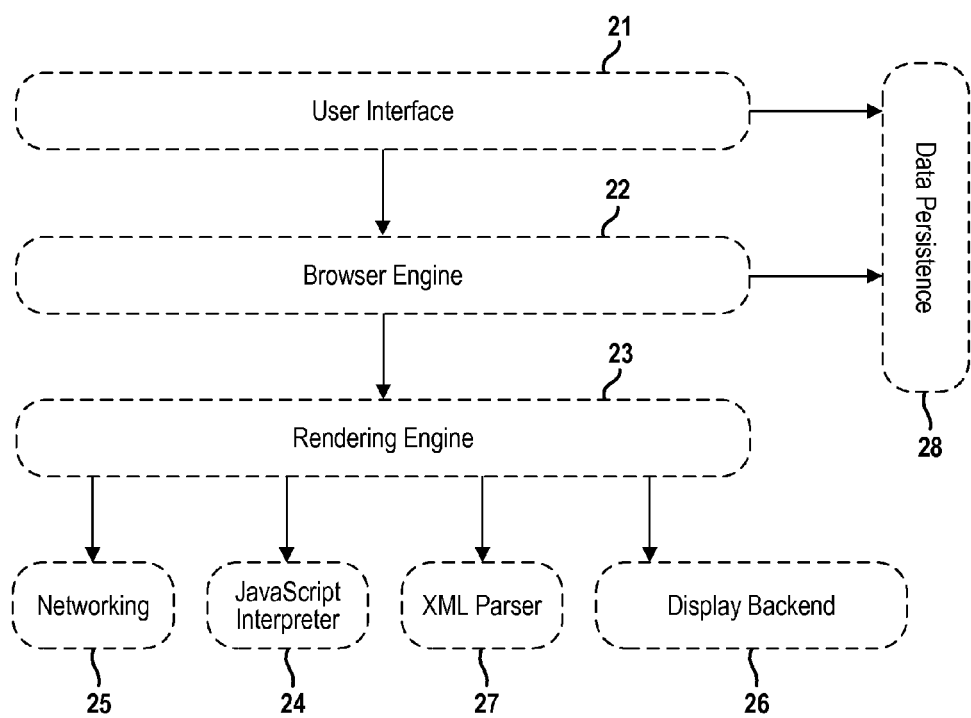
FIG. 2 is a diagram illustrating an example architecture for a web browser.

FIG. 2 illustrates an example architecture for a web browser 20. A user interface component 21 provides methods with which a user interacts with a browser engine 22. The browser engine 22 provides a high-level interface to a rending engine 23, including methods to initiate the loading of a uniform resource locator (URL) and other browsing actions. The rendering engine 23 produces the visual representation of a given URL, including interpreting the content associated with the URL, such as the HTML, XML or JavaScript, and generates the layout that is displayed on the user interface. A script interpreter 24 executes scripts that are embedded in HTML documents and returns results to the rendering engine 23 for display. The networking component 25 provides functionality to retrieve URLs using common protocols such as HTTP. Other components may include a display backend 26, an XML parser 27 and a data persistence component 28. Other architectural arrangements and components are contemplated by this disclosure.

Client-side scripting refers generally to a computing technique employed by web browsers. Scripts expressed in accordance with a scripting language are embedded in HTML documents. In operation, the rendering engine 23 of the web browser parses the script from the HTML document and passes it along to the script interpreter 24. The script interpreter 24 in turn executes the script and returns the results to the rendering engine 23. In one embodiment, the scripting language is further defined as JavaScript and the script interpreter 24 as a JavaScript interpreter. Other types of scripting languages, such as VBScript, and corresponding interpreters and the like are contemplated by this disclosure.

With continued reference to FIG. 1, web page developers often provide enhanced functionality by embedding client web applications as scripts into web pages. The script is executed by the script interpreter 24 in the manner discussed above. To support data localization, the data localization service 10 is exposed via a single application programming interface (API) to the web applications. In one embodiment, the data localization service 10 is exposed via a JavaScript client library by the web browser. Thus, the priority handler 12 is a script in the client library and is also executed by the script interpreter 24.

In operation, the priority handler 12 services the request to localize data and returns a localized representation of the data to the requesting client application 4. More specifically, the priority handler 12 of the data localization service 10 is configured to receive a request to localize data from a requesting client application 4. In a simplified example, data localization service 10 performs a single localization function such as providing a localized date/time format. In this case, the request may include only the data to be localized. In a more robust embodiment, the data localization service may support multiple localization functions. In this case, the request may include an indicator for one type of the localization function (e.g., time formatting v. date formatting) along with the data to be localized.

The request to localize may also include a localization preference parameter indicative of a locale. For example, the localization preference parameter may be a language preference, such as English or Spanish, or may be a geographic location, where the geographic location can be expressed in different manners including a country name, a city name, geographic coordinates or combinations thereof. Other types of localization preference parameters are also contemplated by this disclosure.

The geographic location may be used directly to localize the data as in the case of a localization function that provides a time zone name and its daylight transition time for a given geographic location. Thus, the geographic location is passed as the localization preference parameter by the priority handler 12 to an applicable localization function. In other embodiments, the geographic location is used to infer a language preference. For instance, a geographic location in Japan is correlated by the priority handler 12 to a language preference of Japanese. To infer a language preference, the priority handler may use a table or some other type of data store that maps geographics locations to language preferences. In these instances, the language preference is passed as the localization preference parameter by the priority handler 12 to the localization function.

In some embodiments, the request to localize may not include the localization preference parameter. When a localization preference parameter is not received with the localization request, the priority handler 12 is further configured to determine a localization preference parameter. For example, the priority handler 12 may retrieve a language preference set by a user. The language preference may be a setting in the web browser or stored in a cookie or some other persistent data store on the client device. In another example, the priority handler 12 may determine a current location for the client device 6. To do so, the priority handler 12 may determine the location by interfacing with a GPS module or from an IP address associated with an accessible wireless access point. Other techniques for determining the localization preference parameter may also be used by the priority handler 12. In any case, the localization preference parameter determined by the priority handler 12 is passed, along with the data to be localized, to an applicable localization function.

Depending on the level of native support in the web browser and on the client device, the priority handler 12 will service the request by calling one of the available localization functions. For example, upon receipt of the request to localize data from the requesting client application 4, the priority handler 12 first calls a native data localizer 14. The native data localizer 14 is configured to receive a request to localize data from the priority handler 12 and localize the data in accordance with the localization preference parameter.

Data localization can take many forms. For example, the data localization service 10 may support a function that localizes a time format for presentation to a user. Assume a client application desires to localize a time expressed in Coordinated Universal Time (UTC). The UTC value is passed by the client application 4 to the localization service 10. Given a localization preference parameter such as a geographic location residing in the Pacific Time Zone, the data localization service 10 will convert the UTC time value to a current time value in the Pacific Time Zone and return the localized representation of the data to the client application.

In another example, the data localization service 10 may support a function that formats a date. In some locales, a date may be formatted as mm/dd/yyyy; whereas, in other locales, the date may be formatted as dd/mm/yyyy. Given a localization preference parameter for a desired locale, the data localization service 10 will return the data value in the applicable date format.

In yet another example, the data localization service 10 may provide localized sorting rules. For example, a client application 4 may desire to place a listing of data value in alphabetical order. In this example, the client application 4 passes the listing of data values to the localization service 10. The data localization service will in turn arrange the data values in alphabetical order and return the re-order data values to the client application. In some instances, the client application may desire to order the data values in accordance with an alphabet having unique characters or special sorting rules (e.g., German), or in accordance with an alphabet which is merely different than the language the data values are expressed. To do so, the localization preference parameter specifies an alphabet for ordering the data values. Alternatively, the localization preference parameter may specify a locale which is translated by the priority handler to an alphabet for ordering the data values. It is readily understood that other types of sorting rules may be applied by the data localization service. Moreover, it is understood that other types of data localization functions are within the broader aspects of this disclosure.

To better service the localization request, the native data localizer 14 is a function made available in the web browser. In one embodiment, the native data localizer 14 is integrated directly into the script interpreter 24. However, different instantiations of a web browser on different device types may not support a native data localizer. When the native data localizer 14 is unavailable or is otherwise unable to service the request, it returns a failed indicator to the priority handler 12.

The priority handler 12 calls an external localization function 16 to service the request if the call to the native data localizer 14 fails. Likewise, the external data localizer 16 is configured to receive a request to localize data from the priority handler 12 and localize the data in accordance with the localization preference parameter. The external localization function 16 is implemented by a computer program independent from the web browser but residing on the computing device 6. In one embodiment, the external localization function 16 is implemented as an extension to the web browser. In other embodiments, the external localization function 16 is embedded in the operating system of the computing device. Again, the external data localizer 16 may not be available on all device configurations. When the external data localizer 16 is unavailable or is otherwise unable to service the request, it returns a failed indicator to the priority handler 12.

The priority handler 12 calls a remote localization function 18 to service the request if the calls to both the native data localizer 14 and the external localization function 16 have failed. In this case, the external data localizer 16 resides on a server computer 8 that is remote from the client device. Depending on the availability of a network connection, the priority handler 12 sends the request to localize to the remote data localizer 18. In one embodiment, the priority handler 12 sends the request to localize via an AJAX request to the remote data localizer 18. The remote data localizer 18 is in turn configured to receive a request to localize data from the priority handler 12 and localize the data in accordance with a localization preference parameter.

When calls to each of the localization functions made by the priority handler fails, the priority handler 12 will try resolving the localization request by accessing a default rule set 19. The default rule set 19 contains default rules for responding to localization requests. For example, the priority handler 12 may receive a request to localize a time value. The default rule indicates to present the time value as is. Alternatively, the default rule may indicate to present a local time made available, for example, via another API to the priority handler 12. Upon receipt of a time value from the client application, the priority handler 12 will return the time value to the client application in accordance with the default rule, thereby providing a usable response. In this way, the priority hander ensures that a suitable response is provided to a requesting client application. It is understood that default rules are relatively easy to implement and do not typically require extensive (if any) data sets to resolve the request.

Figure 3A:
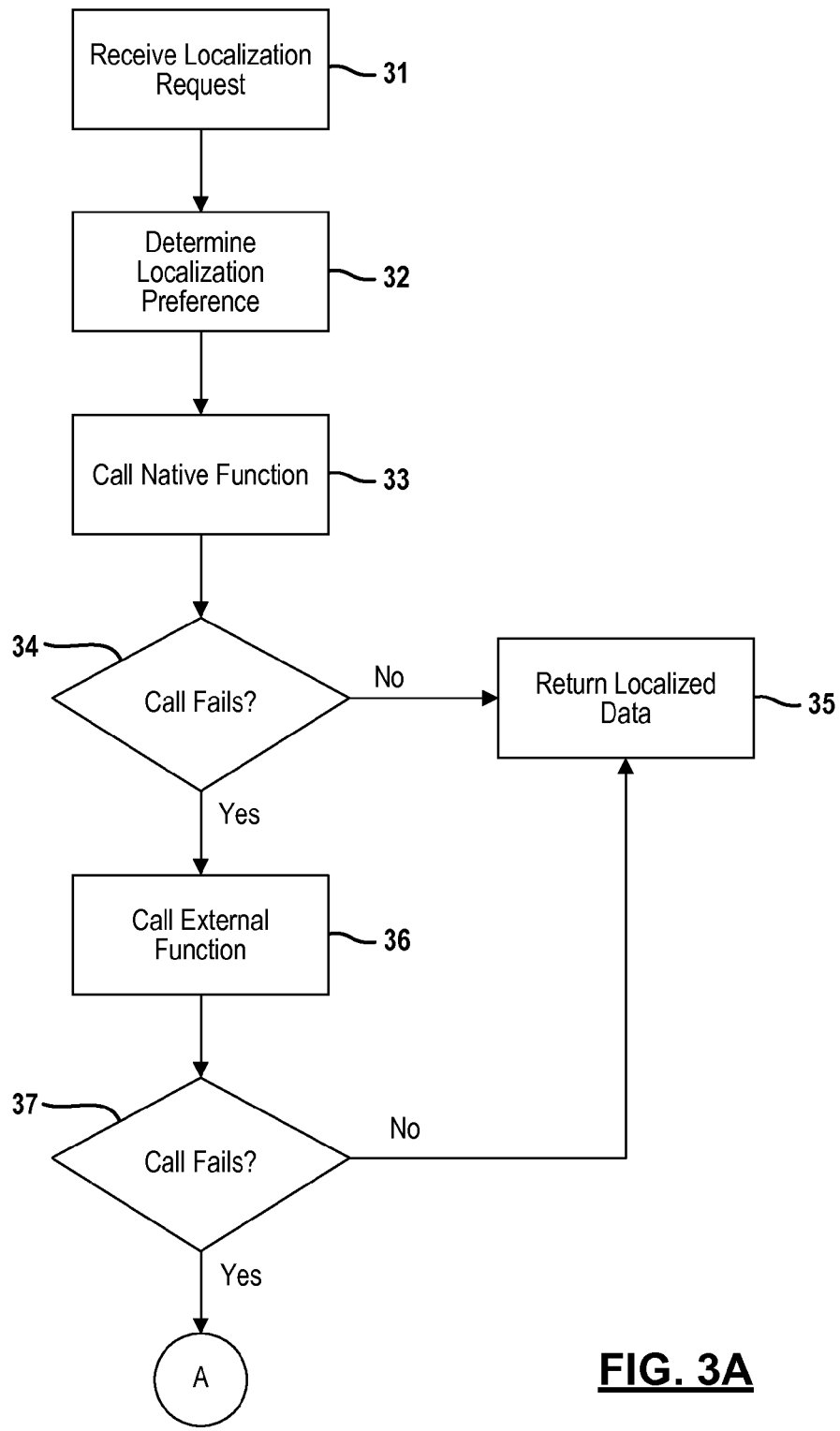
FIGS. 3A and 3B are a flowchart depicting processing steps of a priority handler of the data localization service according to an example embodiment.
Figure 3B:
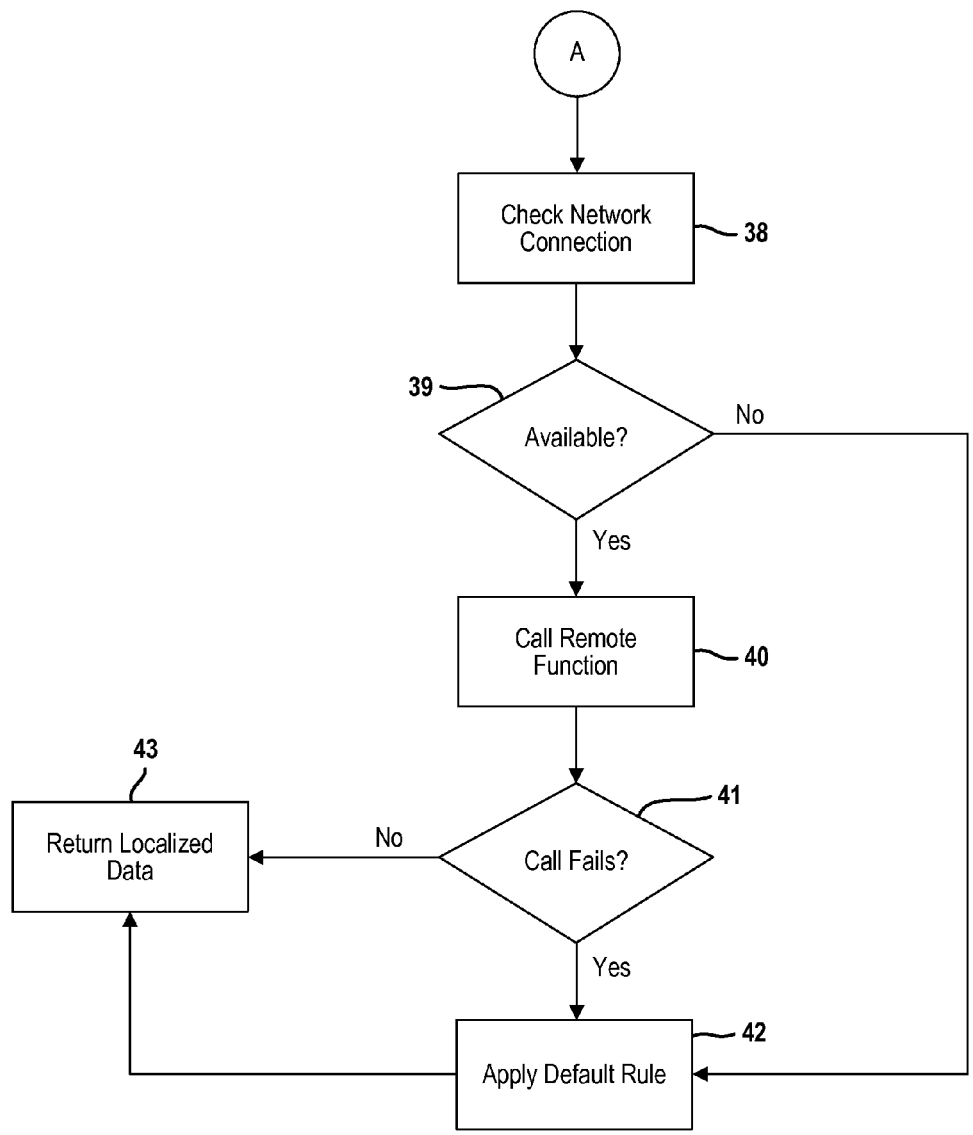

FIG. 3 further illustrates the processing steps for responding to a localization request by the priority handler 12. Upon receiving a request to localize data at 31 from a client application, the priority handler 12 first determines at 32 a localization preference parameter for the request. In some embodiments, the localization preference parameter accompanies the request received from the client application. In other embodiments, the request to localize does not include the localization preference parameter. In these instances, priority handler 12 will determine a localization preference. In any case, the localization preference parameter determined by the priority handler 12 is passed, along with the data to be localized, to an applicable localization function.

Localization functions will be supported differently depending on the web browser and its hosting device. To optimize the user experience, the priority handler 12 will try resolving the localization request locally by calling at 33 a native localization function 14 to service the request. As described above, the native localization function 14 may be integrated in and made available by the web browser. When the call the native localizer function succeeds, a localized representation of the data is returned to the priority handler 12 which in turn passes the localized data at 35 to the client application.

When the native data localizer 14 is unavailable from the web browser or the call thereto otherwise fails, the priority handler 12 will again try resolving the request locally. In particular, the priority handler 12 calls a localization function 16 external to the web browser but still residing on the client device 6. While the web browser may not support a suitable localization function, it is conceivable that a suitable localization function may be provided by the operating system of the client device 6. When the call to this external localizer function 16 succeeds, a localized representation of the data is returned to the priority handler 12 which in turn passes the localized data at 35 to the client application. Resolving the localization request locally will typically occur quicker than resolving the request remotely.

Nonetheless, the priority handler 12 will try resolving the request remotely when the calls to the native localization function and the external localization function fail. Prior to doing so, the priority handler 12 checks availability of a network connection as indicated at 38. If a network connection is available, the priority handler calls a remote localization function 18 to service the request. When the call to this remote localizer function 18 succeeds, a localized representation of the data is returned to the priority handler 12 which in turn passes the localized data at 35 to the client application.

When a network connection is unavailable or the call to the remote localization function fails, the priority handler 12 will apply a default rule to resolve the request as indicated at 42. The priority handler 12 in turn returns the data to the client application in accordance with the default rule. In this way, the priority hander ensures that a suitable response to provided to a requesting client application. As noted above, this hierarchical approach to handling localization requests may be extended to applications other than a web browser residing on the computing device.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable medium storing instructions that, when executed by the one or more processors, cause the one or more processors to implement a data localization service for a web browser residing on a computing device, the data localization service comprising:
    an interpreter in the web browser that executes scripts expressed in a scripting language;
    a priority handler configured to receive a request to localize data from a requesting client application and provide in response thereto a localized representation of the data to the requesting client application, wherein the priority handler is a script expressed in the scripting language and executed by the interpreter; and
    a native data localizer configured to receive a request to localize data from the priority handler and localize the data in accordance with a localization preference parameter indicative of a locale, wherein the native data localizer is a function integrated into the interpreter,
    wherein the priority handler calls an external localization function to service the request when the native data localizer fails, wherein the external localization function is implemented by a computer program independent from the web browser but residing on the computing device, and
    wherein the priority handler calls a remote localization function to service the request when the both the native data localizer and the external localization function fails, wherein the remote localization function resides on a server that is accessed over a data network by the priority handler.

2. The computer-readable medium of claim 1 wherein the requesting client application is a script expressed in the scripting language and executed by the interpreter and, upon receipt of the request to localize data from the requesting client application, the priority handler calls the native data localizer.

3. The computer-readable medium of claim 1 wherein the localization preference parameter is further defined as a language preference or a geographic location.

4. The computer-readable medium of claim 1 wherein the scripting language is further defined as JavaScript.

5. The computer-readable medium of claim 1 wherein the priority handler applies a default rule to the data to be localized when the calls to the native data localizer, the external localization function and the remote localization function fail.

6. A computer-implemented method for localizing data by a data localization service for a web browser residing on a computing device, comprising:
    receiving a request to localize data by the data localization service residing on the computing device;
    calling a native data localizer to service the request, wherein the native data localizer is a function integrated into the web browser and localizes the data in accordance with a localization preference parameter;
    providing the request to an external data localizer to service the request when the native data localizer fails, the external data localizer being executed by a computer program independent from the data localization service but residing on the computing device; and
    providing the request to a remote data localizer to service the request when the native data localizer and the external data localizer both fail, the remote data localizer residing on a server that is accessed over a data network by the data localization service.

7. The computer-implemented method of claim 6 wherein the request is received from a requesting client application.

8. The computer-implemented method of claim 7 wherein the requesting client application is a script expressed in a scripting language and executed by the web browser.

9. The computer-implemented method of claim 8 wherein the scripting language is defined as JavaScript.

10. The computer-implemented method of claim 6 wherein the localization preference parameter is further defined as a language preference or a geographic location.

11. The computer-implemented method of claim 6 further comprising:
applying a default rule to the data to be localized when the native data localizer, the external data localizer, and the remote data localizer fail.

12. The computer-implemented method of claim 11 wherein the remote data localizer fails when the data network is unavailable.

13. The computer-implemented method of claim 6 further comprising determining the localization preference parameter for the request by retrieving a language preference from a data store residing on the computing device.

14. A computing device, comprising:
one or more processors; and
a non-transitory computer-readable medium storing instructions that, when executed by the one or more processors, cause the one or more processors to perform operations comprising:
  receiving a request to localize data by a data localization service for a web browser residing on the computing device;
  calling a native data localizer to service the request, wherein the native data localizer is a function integrated into the web browser and localizes the data in accordance with a localization preference parameter;
  providing the request to an external data localizer to service the request when the native data localizer fails, the external data localizer being executed by a computer program independent from the data localization service but residing on the computing device; and
  providing the request to a remote data localizer to service the request when the native data localizer and the external data localizer both fail, the remote data localizer residing on a server that is accessed over a data network by the data localization service.

15. The computing device of claim 14 wherein the request is received from a requesting client application.

16. The computing device of claim 14 wherein the requesting client application is a script expressed in a scripting language and executed by the web browser.

17. The computing device of claim 14 wherein the localization preference parameter is further defined as a language preference or a geographic location.

18. The computing device of claim 14 wherein the operations further comprise:
applying a default rule to the data to be localized when the native data localizer, the external data localizer, and the remote data localizer fail.

19. The computing device of claim 14 wherein the remote data localizer fails when the data network is unavailable.

20. The computing device of claim 14 wherein the operations further comprise:
determining the localization preference parameter for the request by retrieving a language preference from a data store residing on the computing device.

\* \* \* \* \*